J. Edson.
Boot Crimper.
Nº 97,286. Patented Nov. 30, 1869.
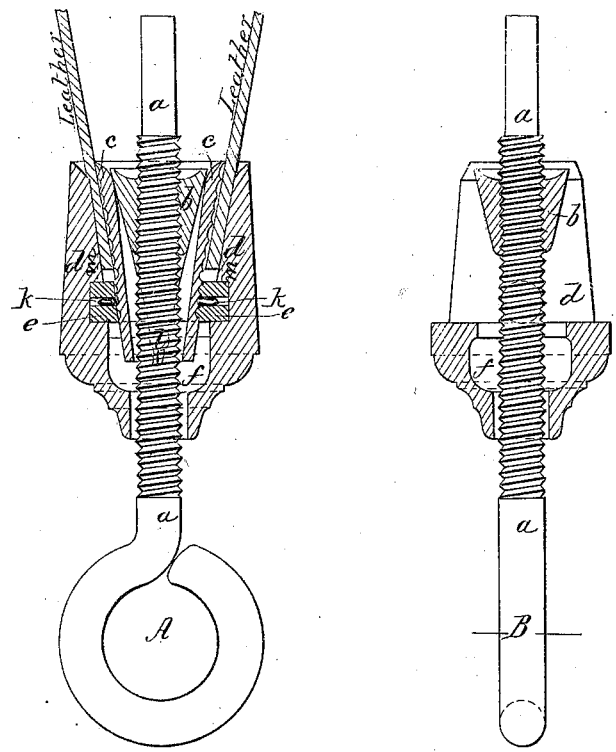
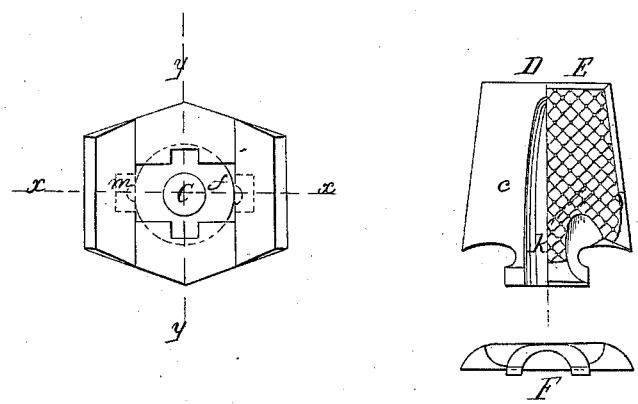
Witnesses:
Alban Andren
Belin
Inventor:
Jacob Edson

United States Patent Office.

JACOB EDSON, OF BOSTON, MASSACHUSETTS.

Letters Patent No. 97,286, dated November 30, 1869.

IMPROVED BOOT-CRIMPER SCREW.

The Schedule referred to in these Letters Patent and making part of the same.

*To all whom it may concern:*

Be it known that I, JACOB EDSON, of 132 Commercial Street, Boston, in the county of Suffolk, in the State of Massachusetts, have invented a new and useful Improvement on a Boot-Crimper Screw; and I do hereby declare that the following is a full and exact description thereof, reference being had to the accompanying drawings, and to the letters of reference marked thereon, in which—

Figure A is a cross-section over *x x*.
Figure B is a section over *y y*.
Figure C is a ground-plan or top view.
Figure D shows half the inside of the jaw, and
Figure E shows half the outside or grooved side of the jaw.
Figure F is an end view of said jaw.

*a* is the screw, worked by manual power, by means of a handle on its lower end, working into the four-sided nut *b*.

*c c* are the jaws, which, on their inner sides, have a perpendicular groove, so as to give room for the screw *a* to pass readily, without friction, between the jaws, when these are brought together.

*d* is the clasp, for receiving the jaws *c c*.

This clasp has two circular apertures, opposite each other, *e e*, to receive suitable springs, which, by their action on the jaws, keep the same open, so as to admit easy the material to be held.

The upper end of jaws *c c*, and lower end of nut *b*, have rounded corners, so as to easily allow of the entrance of the nut between the jaws, in whatever position the nut may be, thereby securing speed in the commencement, and power in the progress of doing the work.

The clasp *d* has on its lower part a round chamber, *f*, extending downward, so as to admit freely of the passing through of the screw *a*, and also receiving the lower end of the jaws *c c*, which encircle in a free and easy manner the screw *a*.

D shows half of the inner side of the jaw, with the perpendicular groove, for clearing the screw, and E shows half the outer side of the jaw, with half of the holding-point *k*, together with the concave spherical surface, which presents to the material to be held a sharp edge, formed in squares, with projecting points, that readily take hold of, and firmly increase its hold on, as the work proceeds.

The lower part of jaws *c c* are brought together and held in place by springs *e e*, because of points *k k*, which prevent their slipping out of the clasp, and allows them to operate easily in their natural position. The relative position of the springs *e e* gives the leverage required for the perfect adjustment of the said jaws, and bring it within the perfect control of the operator, by means of the handle on the lower part of screw *a*.

I am aware that a patent was granted, under No. 66,035, to Mr. Dewitt C. Mowrey, on June 25, 1867, for a boot-crimper screw, but I do not use, as he does, slot holes, going right through the bottom of the clasp *d*, for receiving the jaws, but I use a chamber, *f*, with an opening upward, this said chamber not going right through, as in Mowrey's case. I secure hereby increased strength and freedom from dust and dirt to enter into the clasp.

I do not use, as Mowrey does, a flat T-headed lower part of jaws *c*, but I use a semicircular bottleneck-shaped lower part, as shown in F, for said jaws to pass easily into the chamber *f*, as described.

Having thus described my invention,

I claim, the combination of the screw *a*, nut *b*, crimpers *c*, having a number of square cavities on their outside, with the points *k k*, inside the India-rubber springs *e e*, all combined and acting together with the house *d*, as fully set forth and described.

JACOB EDSON.

Witnesses:
  ALBAN ANDRÉN,
  RELIZE.